Jan. 24, 1956 A. O. RIORDAN 2,732,263
DIVERTER VALVES FOR PNEUMATIC CONVEYING SYSTEMS
Filed Sept. 30, 1952
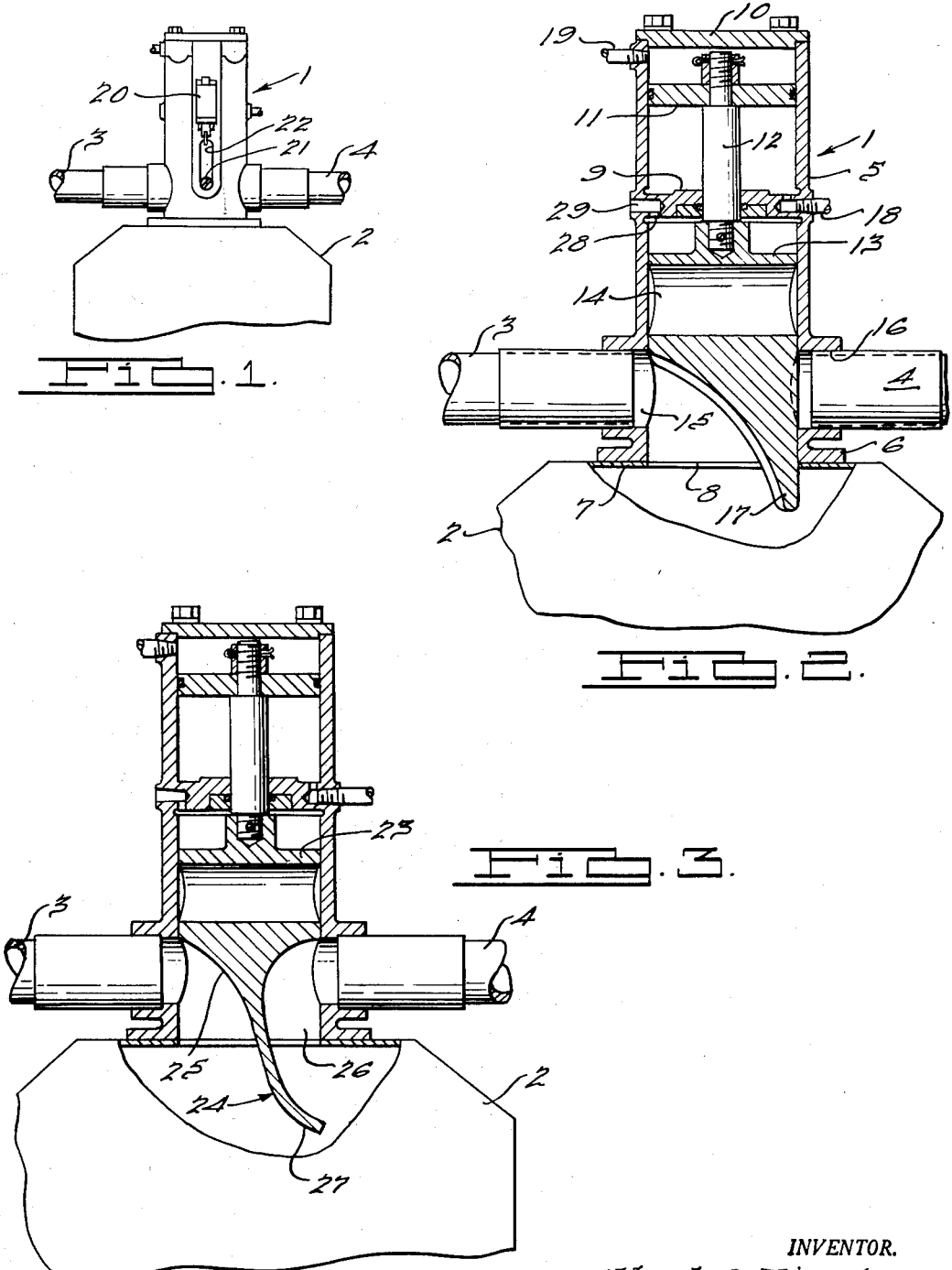
INVENTOR.
Albert O. Riordan.
BY
Harness, Dickey & Pierce
ATTORNEYS.

United States Patent Office 2,732,263
Patented Jan. 24, 1956

2,732,263

DIVERTER VALVES FOR PNEUMATIC CONVEYING SYSTEMS

Albert O. Riordan, Saginaw, Mich., assignor to Baker Perkins Inc., Saginaw, Mich., a corporation of New York Application September 30, 1952, Serial No. 312,256

5 Claims. (Cl. 302—28)

The present invention relates to an improvement in pneumatic conveying systems, and to an improved diverter valve of peculiar utility in pneumatic conveying systems.

In the pneumatic conveying of flour and similar materials, it frequently is necessary to run the conveying conduit past a plurality of bins or receptacles, and to provide branch conduits controlled by valves which may be operated to divert material from the main conduit into any one of the bins or receptacles. In its broadest aspect, the present invention has for its object to provide a valve mechanism for that purpose which is simple, inexpensive, and highly efficient.

Another object of the invention is to provide an improved combination of main conveying conduit, diverter valve and receptacle for the purpose mentioned which eliminates the necessity of branch conveying conduits.

A further object of the invention is to provide a diverter valve which effects a substantial degree of separation of the conveying air and the conveyed material which is diverted from the main conduit, but does not impair the suspension of the conveyed material in the conveying air of the main conduit when the valve is not in its diverting position.

As a general rule, the bins or receptacles in systems of the type mentioned have an outlet for the separated conveying air which flows into the bin or receptacle with the material, which outlet is independent of the main conveying conduit. However, in the system disclosed in the copending application of Norman O. Krenke, Serial No. 306,696, filed August 27, 1952, now Patent No. 2,688,518, September 7, 1954, the material is carried from a bin to any one of a plurality of receptacles, where separation of the air and material occurs, and the separated air discharged from the receptacle is returned to the starting bin by the remainder of the main conveying conduit. Accordingly, it is one of the objects of the present invention to provide a system of this type in which the diverter valve not only operates in one position to divert material into the receptacle, but also to facilitate separation of the air and material and return the separated air to the remainder of the main conduit.

Other objects and advantages of the invention will become apparent from the following specification, the accompanying drawings and the appended claims.

In the drawings:

Figure 1 is a fragmentary elevation view of a portion of a pneumatic conveying system, showing the improved diverter valve mounted on a receptacle and connected to the main conveying conduit; and Figures 2 and 3 are enlarged sectional views, showing the construction of two different forms of the diverter valve.

Referring to Figure 1 of the drawings, a diverter valve mechanism indicated generally at 1 is mounted directly upon the top cover of a suitable receptacle 2 for the conveyed material, and serves to connect the main conveying conduit sections 3 and 4. The receptacle may be a bin or a scale hopper, and in the latter case it will be understood that a portion of each of these main conveying conduits is flexible, so that they do not interfere with the operation of the weighing scale.

The form of valve mechanism shown in greater detail in Figure 2 is intended for use with a receptacle that is provided with an independent air outlet. This valve is provided with a generally cylindrical housing 5 having an attaching flange 6 which is bolted or otherwise secured to the top wall 7 of the housing of the receptacle 2, there being an opening 8 in the wall 7 which communicates with the interior of the valve housing 5. Intermediate its ends, the valve housing is equipped with the lower cylinder head 9 of a cylinder which contains a piston for actuating the valve. The upper head of the cylinder is indicated at 10, and the cylinder contains a piston 11 connected by a rod 12 to a movable valve element 13. A suitable packing or sealing gland is associated with the cylinder head 9 surrounding the rod 12 in order to isolate the lower portion of the valve housing from the operating cylinder section at the top. Valve element 13 is provided with a transverse port 14 which, when the valve element is moved downwardly from its uppermost position, illustrated, will be in axial alignment with a pair of ports 15 and 16, to which are connected the main conduit sections 3 and 4, respectively. In this downward position, material in the main conveying conduit flows straight through valve 1, without any change in direction.

The valve element 13 is provided with a downwardly projecting spadelike element 17 which, when the valve element 13 is in its upper position illustrated, blocks port 16 and deflects material and air entering through port 15 downwardly into the housing of the receptacle 2.

An important feature of the invention resides in the fact that, even when finely powdered materials such as wheat flour are being conveyed, a substantial degree of separation of the conveyed material and the conveying air occurs as the material is deflected by the curved surface of the spade projection 17. This is due to the action of centrifugal force on the conveyed material as it flows over the deflecting surface. The projection thus deflects into the receptacle a stratified jet, one portion of which is highly concentrated solid material and the other principally air. The highly concentrated layer of material falls by gravity into the receptacle, with a minimum of turbulence, and thus leaves little material suspended in the air. Separation is further enhanced by the fact that the air is entering a region of much larger cross section within the receptacle, and thus loses its velocity.

The degree of separation achieved by this combination of valve and receptacle is such that centrifugal separators need not be employed. It is only necessary to provide the receptacle with an air outlet, not shown, which is provided with a filter to remove the relatively minor quantity of fines which remain suspended.

The cylinder at the top of the valve housing 5 is provided with fluid supply pipes 18 and 19, through which air or liquid may be supplied and/or discharged for the purpose of controlling the position of the valve element. These pipes may be conveniently controlled by a conventional four-way valve, which preferably is solenoid operated, as in the case of the diverter valves in the conveying systems of the aforementioned Krenke application and applicant's prior copending application Serial No. 291,837, filed June 5, 1952, now Patent No. 2,688,517, September 7, 1954.

Since for some purposes it is desirable to employ a limit switch in the electrical control circuit, which switch is actuated when the diverter valves moves into and out of its diverting position, such a switch is illustrated in Figure 1 at 20. It will be noted that the switch is actuated by a pin 21 fixed to the valve element 13 and projecting through a slot 22 in the valve housing. The pin 21 and slot 22 also perform the function of preventing rotation of the valve element relative to the housing.

The form of valve shown in Figure 2 is particularly suited for use where a main conveying conduit makes a return loop to any one of a plurality of storage bins. Thus, for example, it could replace the valve 175, the branch conduit 170 and the separator 172 in the system illustrated in Figure 4 of applicant's above-mentioned prior application. In that case, the switch 20 may be employed as the switch 306 of the electrical control system illustrated in Figure 6 of applicant's above-mentioned prior application.

It may be noted that a pair of intersecting passages 28 and 29 in the cylinder head 9 permits escape of air which otherwise would be trapped above valve element 13.

The form of invention illustrated in Figure 3 is employed when the separated air discharged from the receptacle is returned to the main conveying conduit beyond the converter valve; and thus, for example, one such valve may replace the valves 24 and 32, the branch conduits 29 and 31, and the separator 30 in a return loop system of the type disclosed in Figure 1 of the aforementioned Krenke application.

The valve illustrated in Figure 3 of the present application is identical in all respects to the form shown in Figure 2 except that the valve element 23 is provided with a spadelike projection 24 of somewhat different form than the projection 17 of the previously-described valve. Thus, the projection 24 not only provides a curved deflecting surface 25 over which material entering the valve from the main conduit 3 is deflected into the receptacle 2, but the projection 24 is relatively thin and provides a passageway 26 through which air that separates from the material discharged into the receptacle may return to the main conveying conduit 4 at a point beyond the valve. Separation of the conveyed material and the conveying air occurs in the manner described in connection with the valve of Figure 2, and such separation is to some degree enhanced by reversely curving the lower extremity of projection 24, as shown at 27.

Notwithstanding the fact that the material flowing into the receptacle and the separated air leaving the receptacle both pass through the same outlet port at the bottom of the valve housing, separated only by the spadelike projection 24, it has been found that the combination of a valve of the form illustrated in Figure 3 with a larger receptacle upon which it is mounted is effective to remove in excess of ninety-five per cent of wheat flour entering the valve from the main conduit 3 with the conveying air. In other words, the separated air discharged from the receptacle through passageway 26 and the main conduit section 4 contains less than five per cent of its initial flour load. This minor quantity of residual flour is immaterial, particularly when the valve is employed in a return loop system of the type set forth in the aforementioned prior applications. It may be noted, further, that with the valve mechanism of Figure 3 it is unnecessary to provide an auxiliary air outlet for the receptacle 2.

While only two forms of the invention are illustrated and described, it will be apparent that changes in the details of construction and arrangement of the various parts may be indulged in without departing from the spirit of the invention or the scope of the appended claims.

What is claimed is:

1. In a pneumatic conveying system, the combination of a pneumatic conveying conduit, a receptacle having enclosing walls one of which is provided with an inlet opening, a diverter valve having a housing forming a cylindrical chamber open at one end, said housing being mounted with the open end of the housing connected to the wall opening, said housing having a pair of radial ports spaced axially from the open end of the housing and connected respectively to adjacent ends of the conveying conduit, and an axially movable valve element in said housing chamber having a passageway formed therein which connects said radial ports when the valve element is in one position, said element having a deflecting portion projecting through said open end of the housing and into the receptacle for engaging pneumatically conveyed material which enters one of said radial ports when the valve element is moved axially away from said open end of the chamber into another position and deflecting said material into the receptacle, said deflecting portion defining at its side opposite to that engaged by the conveyed material a passageway connecting the open end of the valve chamber to the other radial port through which air may discharge from the receptacle.

2. In a pneumatic conveying system, the combination of a pneumatic conveying conduit, a receptacle having enclosing walls one of which is provided with an inlet opening, a diverter valve having a housing forming a cylindrical chamber open at one end, the opening being of the same diameter as the interior of the chamber, said housing being mounted with the open end of the housing connected to the wall opening, said housing having a pair of radial ports spaced axially from the open end of the housing and connected respectively to adjacent ends of the conveying conduit, and an axially movable valve element in said housing chamber having a passageway formed therein which connects said radial ports when the valve element is in one postion, said element having a deflecting portion projecting toward said open end of the housing and into the receptacle for engaging pneumatically conveyed material which enters one of said radial ports when the valve element is moved axially away from said open end of the chamber into another position and deflecting said material into the receptacle, the surface of said deflecting member which is engaged by conveyed material entering said one radial port being curved to deflect the conveyed material in a curved path and thus cause separation of the conveyed material from the conveying air by centrifugal force as it is deflected.

3. In a pneumatic conveying system, the combination of a pneumatic conveying conduit, a receptacle having enclosing walls one of which is provided with an inlet opening, a diverter valve having a housing forming a cylindrical chamber open at one end, said housing being mounted with the opening end of the housing connected to the wall opening, said housing having a pair of radial ports spaced axially from the open end of the housing and connected respectively to adjacent ends of the conveying conduit, and an axially movable valve element in said housing chamber having a passageway formed therein which connects said radial ports when the valve element is in one position, said element having a deflecting portion projecting through said open end of the housing and into the receptacle for engaging pneumatically conveyed material which enters one of said radial ports when the valve element is moved axially away from said open end of the chamber into another position and deflecting said material into the receptacle, said deflecting portion defining at its side opposite to that engaged by the conveyed material a passageway connecting the open end of the valve chamber to the other radial port through which air may discharge from the receptacle, the surface of said deflecting member which is engaged by conveyed material entering said one radial port being curved to deflect the conveyed material in a curved path to facilitate separation of the conveyed material from the conveying air as it is deflected.

4. A diverter valve, comprising a housing having an outlet port communicating with one end of a cylindrical chamber formed in the housing, said housing having another pair of ports opening radially from said chamber, an axially movable valve element in said chamber and having a passageway formed therein which connects said other ports when the element is in one position, said element having a deflecting portion projecting generally in the direction in which said outlet port opens and effective when the element is moved axially from said one position in a direction away from said outlet port to another position for engaging material which enters one of said radial ports and deflecting said material out through said outlet, said deflecting portion projecting through said outlet port and defining a passageway connecting the outlet port with the other radial port.

5. A pneumatic conveying system as defined in claim 2, characterized further by the fact that the valve element, when moved to its position away from said opening in the chamber into said other position, blocks the other radial port in the valve housing.

References Cited in the file of this patent

UNITED STATES PATENTS 2,380,311     Hornbrook  --------- July 10, 1945

FOREIGN PATENTS 610,915     France  ------------- Sept. 16, 1926